United States Patent [19]

Branan, Jr. et al.

[11] Patent Number: 4,964,693
[45] Date of Patent: Oct. 23, 1990

[54] RADIO HAVING OPTICAL CONTROLS AND METHOD OF OPTICALLY CONTROLLING SAME

[75] Inventors: M. William Branan, Jr., Plantation; John D. Wetters, Coral Springs, both of Fla.

[73] Assignee: Motorola, Inc., Schaumburg, Ill.

[21] Appl. No.: 329,745

[22] Filed: Mar. 28, 1989

[51] Int. Cl.$^5$ .......................... G02B 6/02; G02B 5/22; H01J 5/16; G02F 1/00
[52] U.S. Cl. .............................. 350/96.29; 350/96.16; 350/96.21; 350/320; 350/316; 250/227.11; 455/603; 455/606; 455/612
[58] Field of Search ............... 350/96.15, 96.12, 96.16, 350/96.11, 96.10, 96.20, 96.21, 96.29, 96.30, 320, 311, 315, 316; 250/227.11; 455/603, 606, 610, 612, 617

[56] References Cited

U.S. PATENT DOCUMENTS

| | | | |
|---|---|---|---|
| 3,968,564 | 7/1976 | Springthorpe | 29/580 |
| 4,188,708 | 2/1980 | Frederiksen | 29/572 |
| 4,225,213 | 9/1980 | McBride, Jr. et al. | 350/96.20 |
| 4,373,778 | 2/1983 | Adham | 350/96.20 |
| 4,432,604 | 2/1984 | Schwab | 350/96.21 |
| 4,465,333 | 8/1984 | Caserta et al. | 350/96.20 |
| 4,485,391 | 11/1984 | Poulain et al. | 357/19 |
| 4,553,811 | 11/1985 | Becker et al. | 350/96.20 |
| 4,553,813 | 11/1985 | McNaughton et al. | 350/96.20 |
| 4,556,280 | 12/1985 | Bagby | 350/96.16 |
| 4,585,300 | 4/1986 | Landis et al. | 350/96.20 |
| 4,611,886 | 9/1986 | Cline et al. | 350/96.20 |
| 4,732,446 | 3/1988 | Gipson et al. | 350/96.15 |
| 4,795,900 | 1/1989 | Kokubu | 250/221 |
| 4,829,165 | 5/1989 | Kalawsky | 350/96.16 X |
| 4,925,514 | 5/1990 | Okada et al. | 350/96.29 X |

*Primary Examiner*—Brian Healy
*Attorney, Agent, or Firm*—Thomas G. Berry

[57] ABSTRACT

A light source (124) is used to transmit a light signal down an optical communication channel (12). In a light-reflective embodiment of the present invention, a portion of the transmitted light signal is reflected back (20) into the optical communication channel (12) to an optical receiver (126). By measuring the intensity of the reflected light, one or more operational parameters of the radio can be controlled (106). In a light-transmissive embodiment of the present invention a portion of the transmitted light signal is allowed to pass to the end of the communication channel. By measuring the intensity of the light reaching the end of the optical communicaton channel, one or more operational parameters of the radio can be controlled.

19 Claims, 3 Drawing Sheets

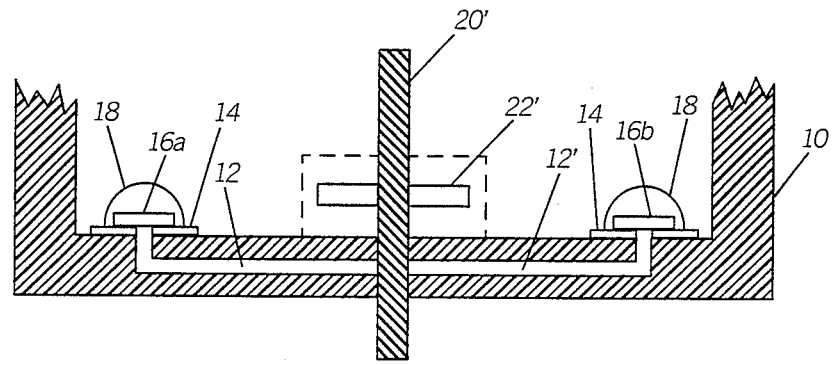
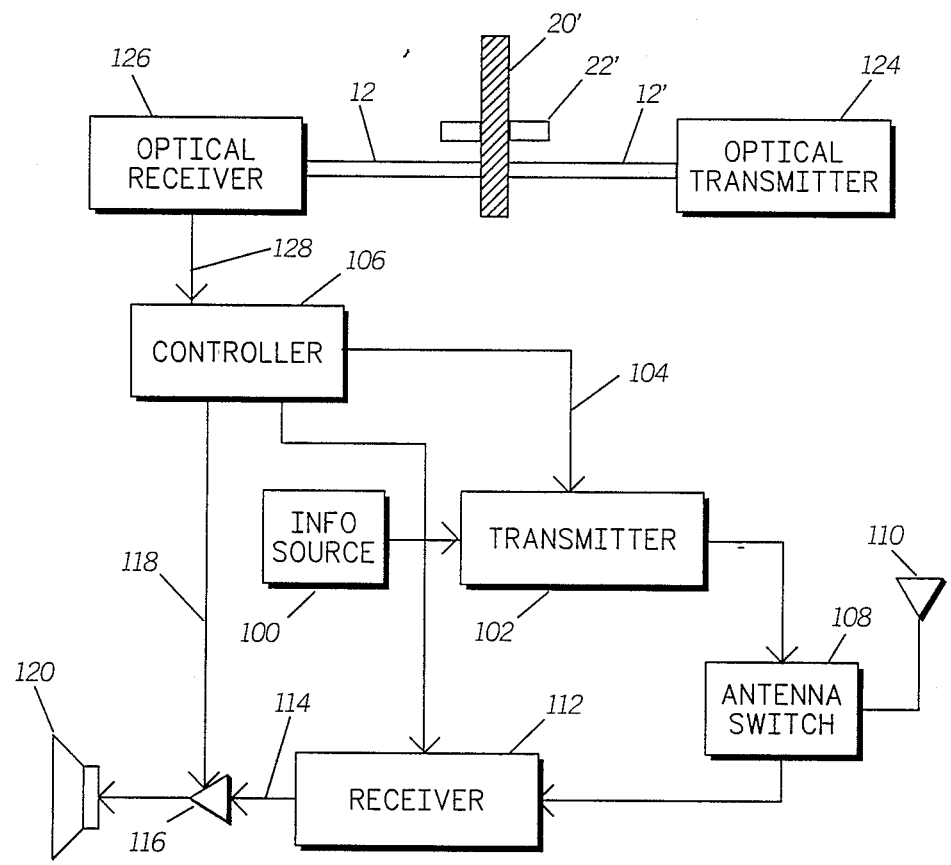

RADIO HAVING OPTICAL CONTROLS AND METHOD OF OPTICALLY CONTROLLING SAME

TECHNICAL FIELD OF THE INVENTION

This invention relates generally to radio frequency communication devices, and more specifically to a radio device employing optics to control one or more operational parameters of the radio.

BACKGROUND OF THE INVENTION

Radios typically have several control knobs, buttons, or switches that enable a radio user to change or vary one or more operational parameters of the radio. Common examples of variable operation parameters include audio volume adjustments, squelch settings, and frequency selection. Possibly less well known, but nevertheless operationally significant, many radios enable an operator to change the radio's identification code, group affiliation, encryption key, or other such parameters essential to the proper operation of contemporary radios.

Generally, the control knobs, buttons and switches used in contemporary radios comprise electromechanical devices each of which must be electrically coupled (usually soldered) to a printed circuit (PC) board or circuit carrying substrate. Due to the mechanical contacts, such electromechanical control arrangements are unreliable and may fail after prolonged exposure to dust, humidity, or temperature. Since consumers demand every increasing levels of reliability, a superior control arrangement for a radio is needed.

SUMMARY OF THE INVENTION

Accordingly, it is an object of the present invention to provide a radio having optical controls.

Briefly, according to the invention, a light source transmits a light signal down an optical communication channel. In a light-reflective embodiment of the present invention, a portion of the transmitted light signal is reflected back down the optical communication channel to an optical receiver. By measuring the intensity of the reflected light, one or more operational parameters of the radio can be controlled. In a light-transmissive embodiment of the present invention, a portion of the transmitted light signal is allowed to pass to the end of the communication channel. By measuring the intensity of the light reaching the end of the optical communication channel, one or more operational parameters of the radio can be controlled.

BRIEF DESCRIPTION OF THE DRAWINGS

FIG. 2a is an illustration of a preferred transmissive embodiment of the present invention;

FIG. 2b is a block diagram of a radio in accordance with the preferred transmissive embodiment of the present invention;

DESCRIPTION OF THE PREFERRED EMBODIMENT

To provide optical controls, the present invention contemplates a reflective embodiment, a transmissive embodiment, and a combined reflective/transmissive embodiment. These preferred embodiments are considered separately below:

REFLECTIVE EMBODIMENT

Figure 1A:
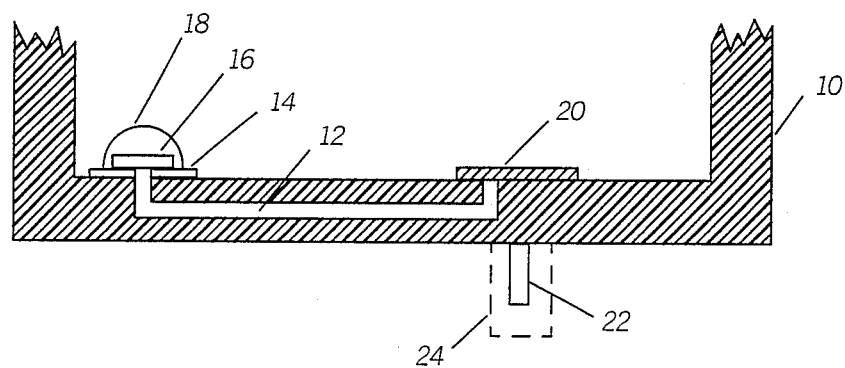
FIG. 1a is an illustration of a preferred reflective embodiment of the present invention.

Referring to FIG. 1a, an illustration of a portion of the radio housing 10 in accordance with the present invention is shown. As seen in FIG. 1a, a housing 10 (or molded circuit board assembly) has molded therein an optical communication channel 12. Typically, conventional radio housings are constructed using well known injected molding processes. According to the invention, one or more optical channels 12 (which may comprise optic fibers) are molded into the housing 10 to provide one or more optical communication channels within the housing. Molding of one or more optical communication channels (which should be transparent to the light source of interest) into the radio's housing is preferred as this process offers physical protection to the optic fibers. Of course, the benefit of optical controls may be achieved without molding the optical channels by careful routing the optical channels inside the housing assembly.

In accordance with the invention, an optical transceiver integrated circuit (IC) 16 is coupled to the communication channel 12, and to electrical conductors 14 that will interconnect the optical transceiver IC 16 with other electronic circuits. Typically, the IC die is protected by a protective die coat 18 such as Type 6101 manufactured by Dow Corning.

Operationally, a light signal is transmitted from the IC 16 through the communication channel 12 so as to illuminate a partially reflective disc 20. According to the invention, the disc 20 is graduated to become more reflective as the disc is rotated (about its axis 22) in one direction, and less reflective as the disc is rotated in the opposite direction. The portion of light signal that is not reflected can either be absorbed, allowed to pass through the disc 20, or merely blocked and not permitted to be reflected back. That portion of the light that is reflected back through the channel 12 is received by the optical IC 16, which converts the reflected light signal into an electronic signal that is forwarded to appropriate control circuitry capable of measuring the intensity of the returned light signal.

To effect a control function, the rotatable axis 22 protrudes outside of the housing 10 so that a conventional control knob 24 may be mounted on the axis. By rotating the knob, the radio's operator will rotate the partially reflective disc 20, which varies the reflected light intensity. Control components respond to the varying light intensity by electronically controlling one or more functions of the radio.

Figure 1B:
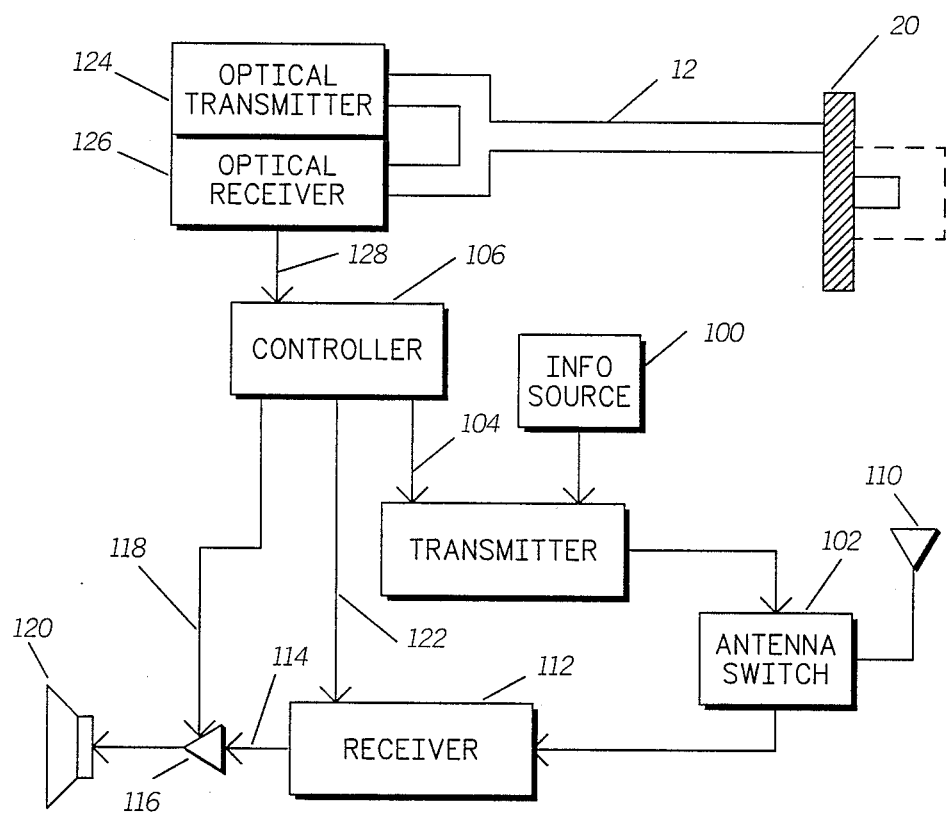
FIG. 1b is a block diagram of a radio in accordance with the preferred reflective embodiment of the present invention.

In FIG. 1b a block diagram of a typical radio employing the invention is shown. An information source 100 provides an information signal (data or voice) to a transmitter 102. The transmitter is activated (i.e., controlled) (104) by a controller 106 to transmit information via the antenna switch 108 to the antenna 110. To receive a signal, the antenna 110 is coupled via the antenna switch 108 to a receiver 112, which provides a recovered audio signal 114 to an amplifier 116. The gain of the amplifier 116 is controlled (118) by the controller 106 to vary the amplitude of the audio signal presented to the operator by the speaker 120.

According to the invention, at least a portion of the radio is optically controlled by including an optical transmitter 124 and an optical receiver 126. Preferably, the optical transmitter 124 and the optical receiver 126 respectfully comprise an MLED 71 and an MRD 701, manufactured by Motorola, Inc., or their functional equivalents. Operationally, the optical transmitter 124 transmits a light signal (modulated or unmodulated) into the optical communication channel 12, which is preferably molded into the radio housing 10. The preferred light signal resides in the infra-red light spectrum, although visible or ultraviolet light could be readily used provided an appropriate detector is employed. The light signal travels through the optical communication channel 12 until it strikes the partially reflective disc 20. Depending upon the rotation of the partially reflective disc 20, some portion of the light signal will be reflected back into the communication channel 12. That portion of reflected light is received by the optical receiver 126, which converts the received light signal into electrical signal 128 that can be measured by the controller 106. By measuring the signal 128, the controller 106 can determine the intensity of the light reflected back through the communication channel 12. Responsive to the signal 128, and thus the reflected light intensity, the controller 106 may modify data parameters (stored within the controller), control transmitter parameters (via control line 104), receiver parameters (via control line 122) or the radio's volume (via control line 118). Since no mechanical or moving electrical connections are used in the switch (control) arrangement of the present invention, reliability is greatly enhanced. Also, the present invention is not susceptible to electromagnetic interference.

TRANSMISSIVE EMBODIMENT

Referring to FIG. 2a, the transmissive mode of the present invention is shown. In the transmissive mode, the radio housing 10 has molded therein optical communication channels 12 and 12', between which is disposed a optical attenuator disc 20'. The optical attenuator disc operates to allow some portion of the light signal to pass from the communication channel 12 to the communication channel 12' to the optical receiver IC 16a. That portion of light not transmitted from the communication channel 12 to the communication channel 12' may be either be reflected, absorbed, or merely blocked using techniques known in the art. Also, as discussed above, the benefit of optical controls may be achieved without molding the optical channels by careful routing the optical channels inside the housing assembly.

Operationally, a light signal (modulated or unmodulated) is transmitted from the IC 16a through the communication channel 12' so as to illuminate the optical attenuator disc 20'. According to the invention, the disc 20' is graduated to become more transparent (i.e., allowing light to pass) as the disc is rotated (about its axis 22') in one direction, and less transparent as the disc is rotated in the opposite direction. The portion of light signal that is not permitted to pass from the optical communication channel 12' to the optical communication channel 12 can either be absorbed or blocked by the disc 20'. That portion of the light that passes into the optical channel 12 is received by the optical receiver IC 16a, which converts the received light signal into an electronic signal that is forwarded to appropriate control circuitry capable of measuring the intensity of the received light signal.

To effect a control function, the axis 22' is mounted so as to allow a portion of the disc 20' to protrude outside of the housing 10 so that a conventional "thumb-wheel" type control is formed. By rotating the disc, the radio's operator varies the transmitted light intensity. Control components respond to the varying light intensity by electronically controlling one or more functions of the radio.

In FIG. 2b a block diagram of a typical radio employing the transmissive embodiment of the invention is shown. An information source 100 provides an information signal (data or voice) to a transmitter 102. The transmitter is activated (i.e., controlled) (104) by a controller 106 to transmit information via the antenna switch 108 to the antenna 110. To receive a signal, the antenna 110 is coupled via the antenna switch 108 to a receiver 112, which provides a recovered audio signal 114 to an amplifier 116. The gain of the amplifier 116 is controlled (118) by the controller 106 to vary the amplitude of the audio signal presented to the operator by the speaker 120.

According to the invention, at least a portion of the radio is optically controlled by including an optical transmitter 124 and an optical receiver 126. The optical transmitter 124 transmits a light signal (modulated or unmodulated) into the optical communication channel 12', which is preferably molded into the radio housing 10. The light signal travels through the optical communication channel 12 until it strikes the optical attenuator disc 20'. Depending upon the rotation of the attenuator disc 20', some portion of the light signal will be passed into the communication channel 12. That portion of light is received by the optical receiver 126, which converts the received light signal into electrical signal 128 that can be measured by the controller 106. By measuring the signal 128, the controller 106 can determine the intensity of the light reflected back through the communication channel 12. Responsive to the signal 128, and thus the received light intensity, the controller 106 may modify data parameters (stored within the controller), control transmitter parameters (via control line 104), receiver parameters (via control line 122) or the volume (via control line 118).

REFLECTIVE/TRANSMISSIVE EMBODIMENT

Figure 3A:
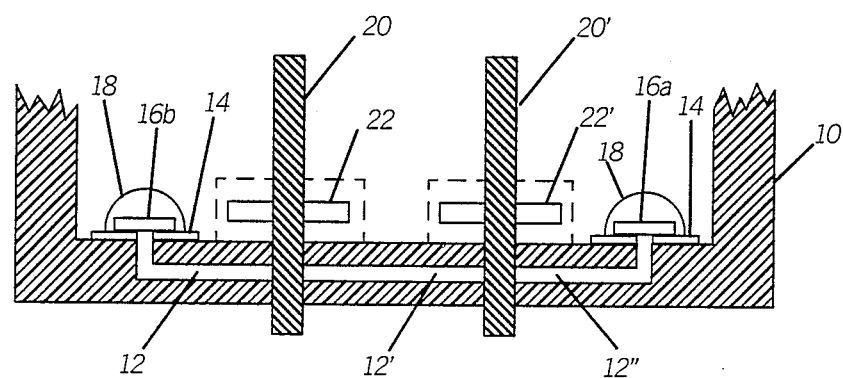
FIG. 3a is an illustration of a preferred reflective/transmissive embodiment of the present invention.

Referring to FIG. 3a, the combined reflective/transmissive mode of the present invention is shown. This combined mode may be useful in providing multiple control functions from a single light source, or may be used to effect, for example, course and fine control adjustments. In the combined mode, the radio housing 10 has molded therein optical communication channels 12, 12', and 12". Between the optical channels 12 and 12' is positioned a partially reflective disc 12, while an optical attenuator disc 20' is disposed between the optical channels 12' and 12". The partially reflective disc 12 allows some portion of the light signal to pass into the optical channel 12', while reflecting back some other portion of the light signal depending upon the rotatable position of the disc. The optical attenuator disc operates to receive the light signal allowed to pass by the disc 20, and then permit some portion of that light signal to pass into the optical channel 12" so that it will be received by the optical receiver IC 16a. That portion of light not transmitted from the communication channel 12 to the communication channel 12' (i.e., the reflected light signal) is received by the optical transceiver IC 16.

Figure 3B:
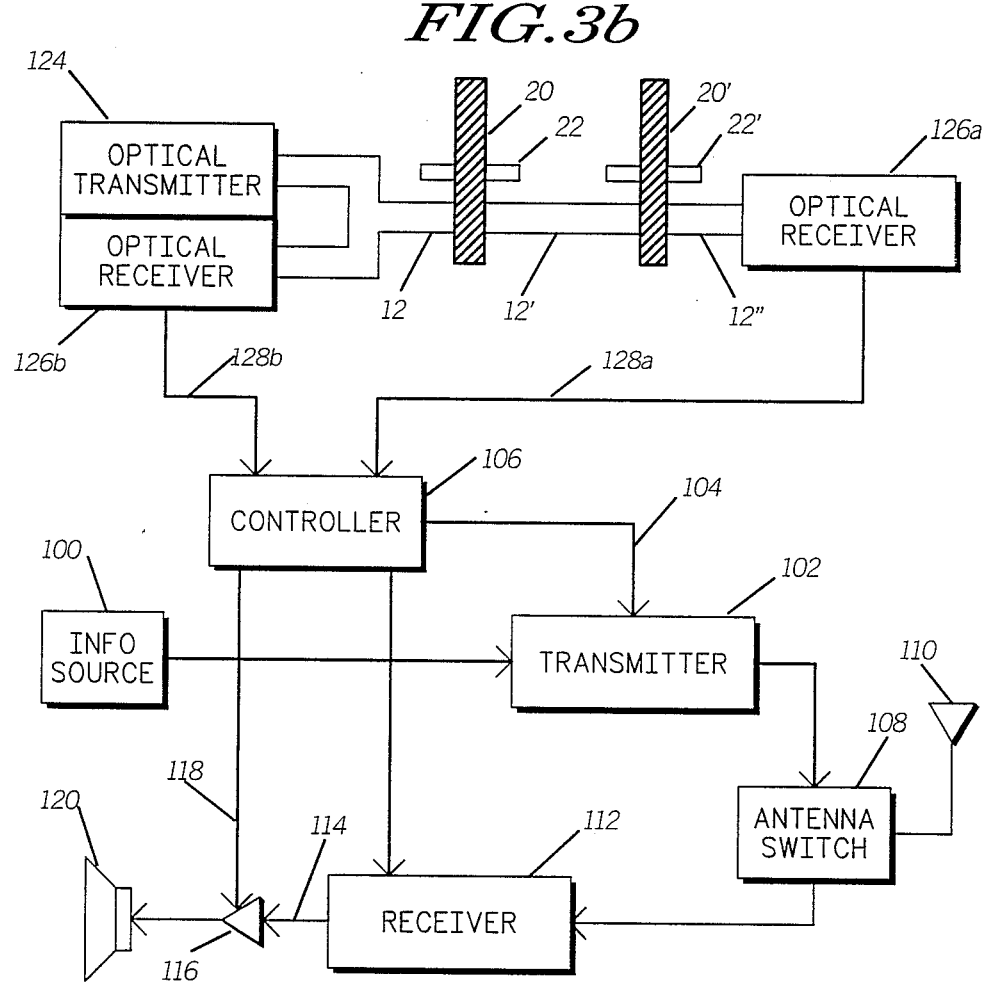
FIG. 3b is a block diagram of a radio in accordance with the preferred reflective/transmissive embodiment of the present invention.

In FIG. 3b a block diagram of a typical radio employing the invention is shown. An information source 100 provides an information signal (data or voice) to a transmitter 102. The transmitter is activated (i.e., controlled) (104) by a controller 106 to transmit information via the antenna switch 108 to the antenna 110. To receive a signal, the antenna 110 is coupled via the antenna switch 108 to a receiver 112, which provides a recovered audio signal 114 to an amplifier 116. The gain of the amplifier 116 is controlled (118) by the controller 106 to vary the amplitude of the audio signal presented to the operator by the speaker 120.

According to the invention, at least a portion of the radio is optically controlled by including an optical transmitter 124 and optical receivers 126 and 126a. The optical transmitter 124 transmits a light signal (modulated or unmodulated) into the optical communication channel 12, which is preferably molded into the radio housing 10. The light signal travels through the optical communication channel 12 until it strikes the partially reflective disc 20. Depending upon the rotation of the partially reflective disc 20, some portion of the light signal will be reflected back into the communication channel 12. That portion of reflected light is received by the optical receiver 126, which converts the received light signal into electrical signal 128 that can be measured by the controller 106. By measuring the signal 128, the controller 106 can determine the intensity of the light reflected back through the communication channel 12.

That portion of the light signal that is not reflected back into the optical channel 12 passed into and travels through the optical communication channel 12' until it strikes the optical attenuator disc 20'. Depending upon the rotation of the attenuator disc 20', some portion of the light signal will be passed into the communication channel 12". That portion of light is received by the optical receiver 126a, which converts the received light signal into electrical signal 128a that also can be measured by the controller 106. By measuring the signals 128 and 128a, the controller 106 can determine the intensity of the light reflected back through the communication channel 12 and the intensity of the light ultimately transmitted through the optical channel 12". Responsive to the signals 128 and 128a, the controller 106 may modify data parameters (stored within the controller), control transmitter parameters (via control line 104), receiver parameters (via control line 122) or the volume (via control line 118). Of course, numerous other combinations of each of these embodiments are possible.

What is claimed is:

1. An optically controlled device, comprising:
   an optical communication channel formed at least in part within at least a portion of a housing for the optically controlled device;
   means for transmitting an optical signal via said optical communication channel to provide a transmitted optical signal;
   means for attenuating said transmitted optical signal to provide an attenuated optical signal;
   means for receiving said attenuated optical signal and for controlling at least one operational parameter of the device in response thereto.

2. The device of claim 1, wherein said optical communication channel comprises an optical fiber molded into a portion of a housing for the device.

3. The device of claim 1, wherein said optical communication channel comprises at least one fiber optic link.

4. The device of claim 1, wherein said operational parameter comprises an operational parameter chosen from the group of parameters: individual identification code, group identification code, encryption key, frequency or channel selection, volume, and squelch.

5. An optically controlled device, comprising:
   an optical communication channel formed at in part within at least a portion of a housing for the optically controlled service;
   means for transmitting an optical signal via said optical communication channel to provide a transmitted optical signal;
   means for reflecting at least a portion of said transmitted optical signal into said optical communication channel to provide a reflected optical signal;
   means for receiving said reflected optical signal and for controlling at least one operational parameter of the device in response thereto.

6. The device of claim 5, wherein said optical communication channel comprises an optical fiber molded into a portion of a housing for the device.

7. The device of claim 5, wherein said optical communication channel comprises at least one fiber optic link.

8. The device of claim 5, wherein said operational parameter comprises an operational parameter chosen from the group of parameters: individual identification code, group identification code, encryption key, frequency or channel selection, volume, and squelch.

9. An optically controlled device, comprising:
   means for transmitting an optical signal into a first optical communication channel to provide a transmitted optical signal;
   means for reflecting at least a portion of said transmitted optical signal into said first optical communication channel to provide a reflected optical signal, and pass a portion of said optical signal into a second optical communication channel to provide a second optical signal;
   means for attenuating said second optical signal to provide an attenuated optical signal;
   means for receiving said reflected optical signal and said attenuated optical signal and for controlling at least one operational parameter of the device in response thereto.

10. The device of claim 9, wherein said optical communication channel comprises an optical fiber molded into a portion of a housing for the device.

11. The device of claim 9, wherein said optical communication channel comprises at least one fiber optic link.

12. The device of claim 9, wherein said operational parameter comprises an operational parameter chosen from the group of parameters: individual identification code, group identification code, encryption key, frequency or channel selection, volume, and squelch.

13. The device of claim 9, wherein said reflecting means and said attenuating means are manually controllable.

14. An optically controlled device, comprising:
   a housing having at least one optical communication channel molded therein;

means for receiving a radio frequency information signal disposed in said housing;

optical transmitter means for transmitting an optical signal via said optical communication channel to provide a transmitted optical signal;

means for attenuating said transmitted optical signal to provide an attenuated optical signal;

optical receiver means for receiving said attenuated optical signal and for controlling at least one operational parameter of the device in response thereto.

15. An optically controlled device, comprising:
a housing having at least one optical communication channel molded therein;
means for receiving a radio frequency information signal disposed in said housing;
means for transmitting an optical signal via said optical communication channel to provide a transmitted optical signal;
means for reflecting at least a portion of said transmitted optical signal into said optical communication channel to provide a reflected optical signal;
means for receiving said reflected optical signal and for controlling at least one operational parameter of the device in response thereto.

16. An optical controlled device, comprising:
a housing having at least a first and second optical communication channel molded therein;
means for receiving a radio frequency information signal disposed in said housing;
optical transmitter means for transmitting an optical signal into a first optical communication channel to provide a transmitted optical signal;
means for reflecting at least a portion of said transmitted optical signal into said first optical communication channel to provide a reflected optical signal, and pass a portion of said optical signal into said second optical communication channel to provide a second optical signal;
means for attenuating said second optical optical signal to provide an attenuated optical signal;
optical receiver means for receiving said reflected optical signal and said attenuated optical signal and for controlling at least one operational parameter of the device in response thereto.

17. A method for optically controlling a device, comprising the steps of:

(a) transmitting an optical signal into a optical communication channel formed at least in part within at least a portion of a housing for the optically controlled device;
(b) attenuating at least a portion of said to provide an attenuated optical signal;
(c) receiving said attenuated optical signal and converting said attenuated optical signal into an electrical signal;
(d) processing said electrical signal and controlling at least one operational parameter of the device in response thereto.

18. A method for optically controlling a device, comprising the steps of:
(a) transmitting an optical signal into an optical communication channel formed at least in part within at least a portion of a housig for the optically controlled device;
(b) reflecting at least a portion of said optical signal to provide a reflected optical signal;
(c) receiving said reflected optical signal and conveting said reflected optical signal into an electrical signal;
(d) processing said electrical signal and controlling at least one operational parameter of the device in response thereto.

19. A method for optically controlling a device, comprising the steps of:
(a) transmitting an optical signal into a first optical communication channel;
(b) reflecting at least a portion of said optical signal to provide a reflected optical signal, and transmitting at least a portion of said optical signal into a second optical communication channel to provide a second optical signal;
(c) attenuating at least a portion of said second optical signal to provide an attenuated optical signal;
(d) receiving said reflected optical signal and converting said reflected optical signal into a first electrical signal;
(e) receiving said attenuated optical signal and conveting said attenuated optical signal into a second electrical signal;
(f) processing said first and second electrical signals and controlling at least one operational parameter of the device in response thereto.

* * * * *

UNITED STATES PATENT AND TRADEMARK OFFICE
CERTIFICATE OF CORRECTION

PATENT NO. : 4,964,693

DATED : October 23, 1990

INVENTOR(S) : Branan, Jr., et al.

It is certified that error appears in the above-identified patent and that said Letters Patent is hereby corrected as shown below:

Column 6, line 13:
Claim 5, line 2, after "formed at" insert --least--.

Column 6, line 15:

Claim 5, line 4, after "controlled" delete "service" and insert therefor -- device --.

Column 7, line 26:
Claim 16, line 1, delete "optical" and insert therefor -- optically --.

Column 7, line 40:
Claim 16, line 15, delete the second "optical".

Column 8, line 1:
Claim 17, line 3, after "signal into" and before "optical" delete "a" and insert therefor -- an --.

Column 8, line 5:
Claim 17, line 7, after "of said" and before "to provide" insert -- optical signal --.

UNITED STATES PATENT AND TRADEMARK OFFICE
CERTIFICATE OF CORRECTION

PATENT NO. : 4,964,693

DATED : October 23, 1990

INVENTOR(S) : Branan, Jr., et al.

It is certified that error appears in the above-identified patent and that said Letters Patent is hereby corrected as shown below:

Column 8, line 17:
Claim 18, line 5, delete "housig" and insert therefor -- housing --.

Signed and Sealed this

Nineteenth Day of May, 1992

Attest:

DOUGLAS B. COMER

*Attesting Officer*   Acting Commissioner of Patents and Trademarks